US012510240B1

(12) United States Patent
Jiang et al.

(10) Patent No.: US 12,510,240 B1
(45) Date of Patent: Dec. 30, 2025

(54) WATERPROOF VENTILATION MODULE AND STAGE LIGHT FIXTURE INCLUDING SAME

(71) Applicant: Guangzhou Haoyang Electronic Co., Ltd., Guangzhou (CN)

(72) Inventors: Weikai Jiang, Guangzhou (CN); Weiquan Jiang, Guangzhou (CN); Zhiqiang Chen, Guangzhou (CN); Mingfu Liao, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 18/785,526

(22) Filed: Jul. 26, 2024

(51) Int. Cl.
*F21V 31/03* (2006.01)
*F21V 21/30* (2006.01)
*F21W 131/406* (2006.01)

(52) U.S. Cl.
CPC .............. *F21V 31/03* (2013.01); *F21V 21/30* (2013.01); *F21W 2131/406* (2013.01)

(58) Field of Classification Search
CPC ........ F21V 31/03; F21V 31/005; F21V 29/60; F21W 2131/406
See application file for complete search history.

(56) References Cited

U.S. PATENT DOCUMENTS 10,962,215 B2 * 3/2021 Jiang ........................ F21V 29/89
11,835,214 B1 * 12/2023 Jiang ...................... F21V 31/005
12,215,848 B1 * 2/2025 Jiang ........................ F21V 29/70
2010/0060132 A1 * 3/2010 Liu ......................... F21V 29/74 313/46
2016/0369997 A1 * 12/2016 Johansen ................ F21V 31/03
2019/0137090 A1 * 5/2019 Jiang ...................... F21V 29/717
2021/0071849 A1 * 3/2021 Li ........................... F21V 15/01
2021/0131657 A1 * 5/2021 Jiang ....................... F21V 21/30
2023/0175683 A1 * 6/2023 Liao ........................ F21V 29/67 362/373
2023/0414531 A1 12/2023 Jurik et al.
2025/0003582 A1 * 1/2025 Jiang ....................... F21V 21/29

FOREIGN PATENT DOCUMENTS

CN 106328214 A 1/2017
CN 111372404 A 7/2020
CN 220707290 U 4/2024
CN 220707291 U 4/2024
CN 220870807 U 4/2024

* cited by examiner

*Primary Examiner* — William N Harris
(74) *Attorney, Agent, or Firm* — Muncy, Geissler, Olds & Lowe, P.C.

(57) ABSTRACT

A waterproof ventilation module has a cavity including a first side plate and a second side plate. The first side plate is provided with at least one first air vent and at one side of the first side plate opposite to the second side plate is provided with at least one first water blocking baffle surrounding the first air vent, and the second side plate is provided with at least one second air vent, the first air vent and the second air vent being staggered in position. The ventilation module in the present invention achieves waterproof performance while allowing air communication between the first air vent and the second air vent for heat dissipation.

20 Claims, 6 Drawing Sheets

WATERPROOF VENTILATION MODULE AND STAGE LIGHT FIXTURE INCLUDING SAME

CROSS REFERENCE TO RELATED APPLICATIONS

The present application claims priority from Chinese Application No. CN 202421530018.8 filed on Jun. 29, 2024, all of which are hereby incorporated herein by reference.

TECHNICAL FIELD

The present invention relates to the technical field of stage light fixtures, and more particularly, relates to a waterproof ventilation module and a stage light fixture including the same.

BACKGROUND

The housing forming an accommodating cavity of the existing stage light fixture is generally provided with an air inlet and an air outlet for heat dissipation, due to high power of the stage light fixture. With such configuration, cold air outside is extracted into the cavity through the air inlet to cool the elements in the housing, and hot air is discharged to the outside through the air outlet. However, in the case of suffering from unexpected raining when used outdoors, rainwater would enter the housing via the air inlet, which would cause damage to the elements therein, such as affecting light effects by the attached rainwater on the lens, short-circuiting the electrical elements, and making the metal components rusty. Therefore, the existing stage light fixture is unsatisfactory on the requirements for high-effective heat dissipation and anti-rainwater.

SUMMARY

It is therefore an object of the present invention to provide a waterproof ventilation module and a stage light fixture including the same, which simultaneously has waterproof performance and ventilation function for heat dissipation.

One aspect of the present invention provides a waterproof ventilation module, which includes a cavity having a first side plate and a second side plate. The first side plate is provided with at least one first air vent and at one side of the first side plate opposite to the second side plate is provided with at least one first water blocking baffle surrounding the first air vent. The second side plate is provided with at least one second air vent. The first air vent and the second air vent are staggered in position.

With the first air vent and the second air vent staggered in position, the waterproof ventilation module of the present invention can avoid rainwater straight moving to the first air vent from the second air vent, or vice versa. In addition, with at least one first water blocking baffle surrounding the first air vent arranged at the side of the first side plate opposite to the second side plate, the rainwater entering the cavity will be blocked by the first water blocking baffle when moving to the first air vent along the first side plate, which can further prevent rainwater entering the first air vent. Therefore, the ventilation module in the present invention achieves waterproof performance while allowing air communication between the first air vent and the second air vent.

In order to reduce possibility for rainwater to curvilinearly move and enter the first air vent from the second air vent due to airflow disturbance, the minimum distance between the edges of the first air vent and the second air vent is preferably more than 1 cm.

To ensure that the rainwater entering the cavity is not prone to crossing the first water blocking baffle when flowing to the first air vent along the first side plate and thus is blocked out of the first air vent under the action of the first water blocking baffle, the first water blocking baffle in the present invention preferably protrudes from the first side plate more than 0.5 cm. Particularly, the height of the first water blocking baffle is more than 0.5 cm.

For preventing dust in the air flow flowing to the first air vent from the second air vent and thus keeping the air flowing from the first air vent adequately clear, the air passage between the first air vent and the second air vent is provided with an anti-dust net.

In particular, the side of the second side plate close to the first side plate is connected with a load support for bearing the anti-dust net, the second side plate is provided with a mounting opening corresponding to the load support for assembling and disassembling the anti-dust net and a cover for covering the mounting opening. With such configuration, it is convenient for users to assemble and disassemble the anti-dust net through the mounting opening and fasten the anti-dust net through the load support, and the anti-dust net is prevented from exposing to outside with the mounting opening covered by the cover.

In order to further block the rainwater entering the cavity to enter the first water blocking baffle when moving away from the first side plate along the first water blocking baffle, a water blocking ring may be further provided outside the first water blocking baffle according to the present invention.

In a case that multiple first air vents are provided, only one first water blocking baffle is provided for surrounding all the first air vents. As an alternative, multiple first water blocking baffles can also be provided, in this case each water blocking baffle surrounds at least one first air vent to make all the air vents surrounded.

According to the present invention, at least one second water blocking baffle surrounding the first water blocking baffle may be further provided. With the configuration of the second water blocking baffle surrounding the first water blocking baffle, the rainwater in the cavity can be prevented from flowing towards opposite side of the first air vent along the second side plate to enter the first air vent.

Furthermore, the first water blocking baffle and the second water blocking baffle are staggered in the height direction. This makes the rainwater crossing the second water blocking baffle not prone to entering the first air vent in the first water blocking baffle.

To sufficiently ensure that rainwater crossing the second water blocking baffle hardly enters the first air vent in the first water blocking baffle, the staggered height of the first water blocking baffle and the second water blocking baffle in the height direction is preferably over 0.1 cm.

In addition, the outer edge of the water blocking ring arranged outside the first water blocking baffle is positioned out of the second water blocking baffle. Such configuration makes the rainwater blocked by the water blocking ring not enter inner side of the second water blocking baffle when falling down from the outer edge of the water blocking ring, thereby further effectively avoiding the rainwater entering the first air vent.

Preferably, only one second water blocking baffle is provided, which surrounds all the first water blocking baffle, so that the second water blocking baffle and the first water blocking baffle will not interfere with each other and easy to align each other, when the first side plate and the second side plate are oppositely arranged.

To mount and form the cavity conveniently and arrange the first water blocking baffle, the second side plate is preferably detachably fastened to the first side plate.

Another aspect of the present invention provides a stage light fixture including the waterproof ventilation module in any case mentioned above. The accommodating cavity in the light head, the arm or the base of the light fixture is in air communication with the outside via the waterproof ventilation module. With the configuration of the waterproof ventilation module, it can achieve heat dissipation of the accommodating cavity via air communication with the outside while effectively prevent rainwater entering the accommodating cavity.

Preferably, the air inlet and the air outlet of the accommodating cavity are both provided with the waterproof ventilation module, so that rainwater cannot enter the accommodating cavity through either the air inlet or the air outlet.

The accommodating cavity in the light head, the arm or the base is in air communication each other. In such configuration, the waterproof ventilation module can be arranged in any reasonable redundant position inside the stage light fixture and easy to achieve waterproof and ventilation performance of the whole stage light fixture.

The first side plate of the waterproof ventilation module may be a separate piece fixed on thee side wall of the accommodating cavity. However, in a bid to simplify structure of the waterproof ventilation module, the first side plate of the waterproof ventilation module is preferably formed by a portion of the side wall of the accommodating cavity and the second side plate of the waterproof ventilation module is arranged outside the accommodating cavity.

Specifically, the first side plate may be formed by the support plate of the light head pivoting with the arm and the second side plate is formed by the side cover covering outside the support plate. With the existing support plate and side cover forming the waterproof ventilation module, additional components are not required, thereby achieving high space utilization and compact structure of the stage light fixture.

Additionally or alternatively, the first side plate is formed by the mounting plate of the light-outlet lens of the light head, which allows air to flow into the light head and be discharged from the light head at the light-outlet position.

Additional advantages, features and possible applications of the present invention will be apparent from the description which follows, in which reference is made to the embodiments illustrated in the drawings.

DETAILED DESCRIPTION

Figure 1:
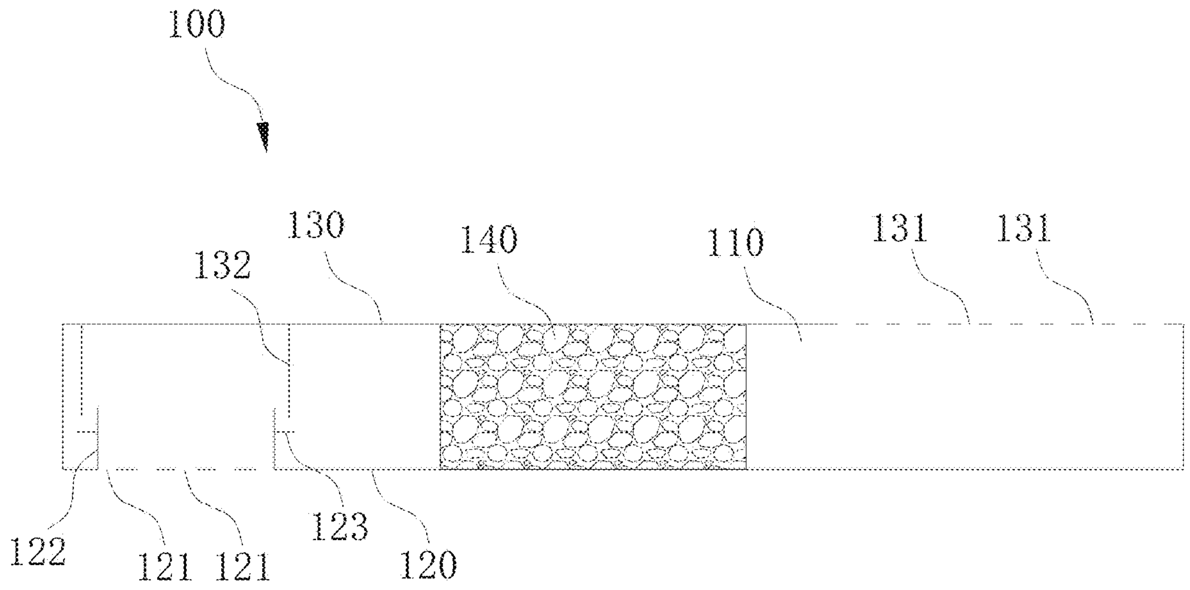
FIG. 1 is a section view of a waterproof ventilation module according to an embodiment of the present invention.

The accompanying drawings are for exemplary illustration only, and should not be construed as limitations on this invention. In order to better illustrate the present embodiment, some parts of the accompanying drawings may be omitted, enlarged or reduced, and do not represent the size of actual products. For those skilled in the art, it is understandable that certain well-known structures and descriptions thereof may be omitted in the drawings. The positional relationship described in the drawings is only for exemplary illustration, and should not be construed as a limitation on this invention.

Figure 2:
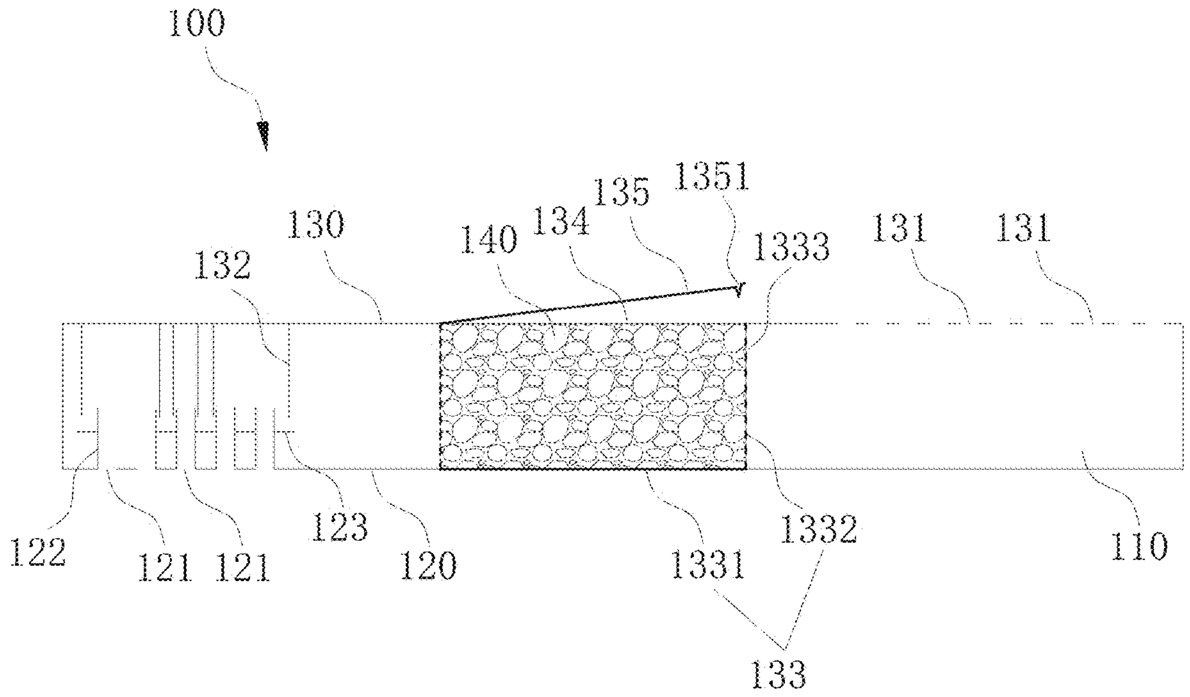
FIG. 2 is a section view of a waterproof ventilation module according to another embodiment of the present invention.
Figure 3:
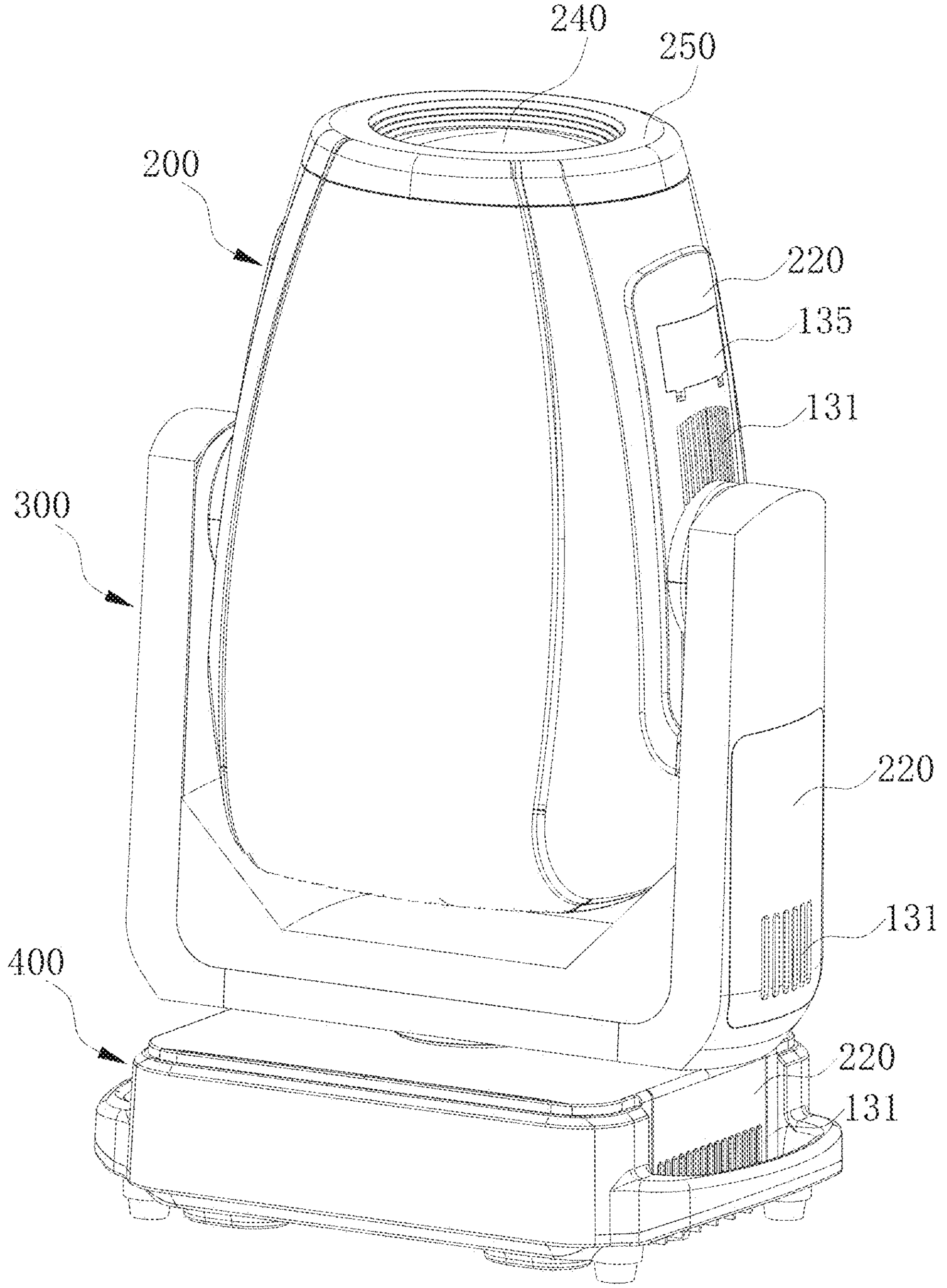
FIG. 3 is a perspective view of a stage light fixture according to an embodiment of the present invention.

FIGS. 1 to 2 provide a waterproof ventilation module 100, including a cavity 110 which has a first side plate 120 and a second side plate 130. The first side plate 120 is provided with at least one first air vent 121. At one side of the first side plate 120 opposite to the second side plate 130 is provided with at least one first water blocking baffle 122 surrounding the first air vent 121, such first water blocking baffle 122 extends towards the second side plate 130. The second side plate 130 is provided with at least one second air vent 131. The first air vent 121 and the second air vent 131 are staggered in position, namely not oppositely arranged in parallel.

In operation, the second air vent 131 is usually in air communication with the outside and the first air vent 121 is in air communication with the accommodating cavity under waterproof protection. According to the waterproof ventilation module 100 in the present embodiment, with the first air vent 121 and the second air vent 131 staggered in position, it can avoid rainwater straight moving to the first air vent 121 from the second air vent 131. In addition, with at least one first water blocking baffle 122 surrounding the first air vent 121 arranged at the side of the first side plate 120 opposite to the second side plate 130, the rainwater entering the cavity 110 will be blocked by the first water blocking baffle 122 when moving to the first air vent 121 along the first side plate 120, which can further prevent rainwater entering the first air vent 121. Therefore, the ventilation module 100 in the present embodiment achieves waterproof performance while allowing air communication between the first air vent 121 and the second air vent 131.

It should be noted that the first air vent 121 and the second air vent 131 staggered in position means that projection of the second air vent 131 on the first side plate 120 in the direction perpendicular to the first side plate 120 are out of the first air vent 121.

In this embodiment, the first side plate 120 and the second side plate 130 are oppositely arranged. However, it is conceivable that the two side plates in other embodiments are not necessary to be fully oppositely arranged.

The cavity 110 in the present embodiment is fully sealed at the connection points, in addition to the first and second air vents 121, 131. However, it is conceivable that the cavity 110 in other embodiments can further have space in air communication with the outside.

The height direction of the first water blocking baffle 122 is perpendicular to the first side plate 120 in the present embodiment. It can also not fully perpendicular to the first side plate 120 in other embodiments.

In the present embodiment, the first air vent 121 is in circular shape and the first water blocking plate 122 is accordingly in cylindrical form. Other basic shape is also accessible.

According to a preferable embodiment, the distance between the closet edges of the first air vent 121 and the second air vent 131 is more than 1 cm. Such distance between the first and second air vents 121, 131 can reduce possibility for rainwater to curvilinearly move and enter the first air vent 121 from the second air vent 131 due to airflow disturbance.

According to a preferable embodiment, the first water blocking baffle 122 protrudes from the first side plate 120 more than 0.5 cm. Such height can ensure the rainwater in the cavity 110 not prone to crossing the first water blocking baffle 122 when flowing to the first air vent 121 along the first side plate 120, and thus blocking the rainwater out of the first air vent 121 under the action of the first water blocking baffle 122.

More preferably, the first water blocking baffle 122 protrudes from the first side plate 120 less than 5 cm, which can avoid too large volume of the waterproof ventilation module 100 due to too large distance between the first side plate 120 and the second side plate 130.

According to the present embodiment, the air passage between the first air vent 121 and the second air vent 122 is provided with an anti-dust net 140, which is configured to prevent dust in the air flow flowing to the first air vent 121 from the second air vent 131, thereby ensuring the air flowing from the first air vent 121 adequately clear.

In addition, as clearly shown in FIG. 2, the side of the second side plate 130 close to the first side plate 120 is connected with a load support 133 for bearing the anti-dust net 140, the second side plate 130 is provided with a mounting opening 134 corresponding to the load support 133 for assembling and disassembling the anti-dust net 140 and a cover 135 for covering the mounting opening 134. With such configuration, it is convenient for users to assemble and disassemble the anti-dust net 140 through the mounting opening 134 and fasten the anti-dust net 140 through the load support 133, and the anti-dust net 140 is prevented from exposing to outside with the cover 135 covering the mounting opening 134.

In this embodiment, the load support 133 is integrated with the second side plate 130. The load support 133 in the present embodiment specifically includes a load plate 1331 and a connecting plate 1332 connected to the load plate 1331 and the first side plate 120. The connecting plate 1332 is provided with a plurality of air passing holes 1333 for allowing air to flow between the first air vent 121 and the second air vent 131.

The cover 135 is provided with an elastic locking tab 1351 for locking with the second side plate 130.

A water blocking ring 123 is further provided outside the first water blocking baffle 122, which is configured to block the rainwater in the cavity 110 to enter inner side of the first water blocking baffle 122 when moving away from the first side plate 120 along the first water blocking baffle 122.

In the present embodiment, the water blocking ring 123 is made of soft rubber material, sleeved outside the first water blocking baffle 122 and fixed under elastic action.

The anti-dust net 140 may be arranged at any position in the air passage, but preferably at the position close to the second air vent 131. In this way, the anti-dust net 140 can scatter the rainwater entering the second air vent 131 to make the rainwater not prone to flowing in strands, which thus improves waterproof performance. In addition, it also ensures clear air flow to enter the cavity 110 from the source.

In a preferable embodiment, the first side plate 120 is provided with a plurality of first air vents 121 and only one first water blocking baffle 122 is provided for surrounding all the first air vents 121, as shown in FIG. 1. Alternatively, a plurality of first water blocking baffles 122 are also provided, each water blocking baffle 122 surrounds at least one first air vent 121 making all the air vents 121 surrounded, as shown in FIG. 2

More preferably, each first air vent 121 is correspondingly provided with at least one water blocking baffle 122, namely each first air vent 121 is correspondingly surrounded by one water blocking baffle 122.

According to a preferable embodiment, the second side plate 130 is provided with at least one second water blocking baffle 132 surrounding the first water blocking baffle 122. With the configuration of the second water blocking baffle 132 surrounding the first water blocking baffle 122, it can prevent the rainwater in the cavity 110 flowing towards opposite side of the first air vent 121 along the second side plate 130 and then entering the first air vent 121.

The height of the second water blocking baffle 132 is preferably not less than 0.5 cm.

More preferable, the first water blocking baffle 122 and the second water blocking baffle 132 are staggered in the height direction, namely the first water blocking baffle 122 and the second water blocking baffle 132 overlap in the height direction. This design ensures that even if the rainwater crosses the second water blocking baffle 132, such rainwater is not prone to entering the first air vent 121 in the first water blocking baffle 122.

The staggered height of the first water blocking baffle 122 and the second water blocking baffle 132 in the height direction is over 0.1 cm, namely the first water blocking baffle 122 and the second water blocking baffle 132 overlap over 0.1 cm of height. Such height sufficiently ensures that rainwater crossing the second water blocking baffle 132 hardly enters the first air vent 121 in the first water blocking baffle 122.

The outer edge of the water blocking ring 123 arranged outside the first water blocking baffle 122 is positioned out of the second water blocking baffle 132. Such configuration makes the rainwater blocked by the water blocking ring 123 not enter inner side of the second water blocking baffle 132 when falling down from the outer edge of the water blocking ring 123, thereby further effectively avoiding the rainwater entering the first air vent 121.

In the case that multiple first air vents 121 and multiple first water blocking baffles 122 are provided, each first water blocking baffle 122 is correspondingly provided with one water blocking ring 123, and all the water blocking rings 123 outside the multiple first water blocking baffles 122 in this case are connected to be a whole.

Regardless of the number of the first water blocking baffle 122, the second water blocking baffle 132 may be only one which surrounds all the first water blocking baffle 122, as shown in FIG. 1, also may be multiple, each second water blocking baffle 132 surrounds one or more than one first water blocking baffle 122, as shown in FIG. 1.

Preferably, only one second water blocking baffle 132 is provided which surrounds all the first water blocking baffle 122, so that the second water blocking baffle 132 will not interfere with the first water blocking baffle 122 and easy to align each other when the first side plate 120 and the second side plate 130 are oppositely arranged.

The cavity 110 is preferably formed by clasping the first side plate 120 and the second side plate 130 each other.

According to a preferable embodiment, the second side plate 130 is detachably fastened to the first side plate 120. This is convenient to mount and form the cavity 110 and arrange the first water blocking baffle 122.

FIGS. 3-7 provides a stage light fixture including the waterproof ventilation module 100 in any case mentioned above. The accommodating cavity 500 in the light head 200, the arm or the base 400 of the light fixture is in air communication with the outside via the waterproof ventilation module 100. With the configuration of the waterproof ventilation module 100, it can achieve heat dissipation of the accommodating cavity 500 via air communication with the outside while effectively prevent rainwater entering the accommodating cavity 500.

The stage light fixture may only include the light head 200, or may include the light head 200 and the arm 300 for supporting rotation of the light head 200, or may include the light head 200, the arm 300 for supporting rotation of the light head 200, and the base 400 for supporting rotation of the arm 300. The accommodating cavity 500 in the light head 200 is provided with a light source and a light effect-generated assembly for intercepting the light beam form the light source and generating light effects. The light effect-generated assembly includes one or more than one of CMY module, a light shaping module 260, a fire wheel module 270, pattern wheel module and color wheel module. The accommodating cavity 500 in the base 400 is provided with a switch mode power supply.

In a preferable embodiment, the air inlet and the air outlet of the accommodating cavity 500 are both provided with the waterproof ventilation module 100, so that rainwater cannot enter the accommodating cavity 500 through either the air inlet or the air outlet.

In the case that the air inlet of the accommodating cavity 500 is provided with the waterproof ventilation module 100, air outside flows from the second air vent 131 to the first air vent 121. While in the case that the air outlet of the accommodating cavity 500 is provided with the waterproof ventilation module 100, air outside flows from the first air vent 121 to the second air vent 131.

In a preferable embodiment, all the accommodating cavity 500 in the light head 200, the arm 300 and the base 400 are in air communication each other. In such configuration, the waterproof ventilation module 100 can be arranged in any reasonable redundant position inside the stage light fixture, which is easy to achieve waterproof and ventilation performance of the whole stage light fixture.

Preferably, the first side plate 120 of the waterproof ventilation module 100 is formed by a portion of the side wall of the accommodating cavity 500 and the second side plate 130 of the waterproof ventilation module 100 is arranged outside the accommodating cavity 500. This can simplify structure of the waterproof ventilation module 100.

Figure 4:
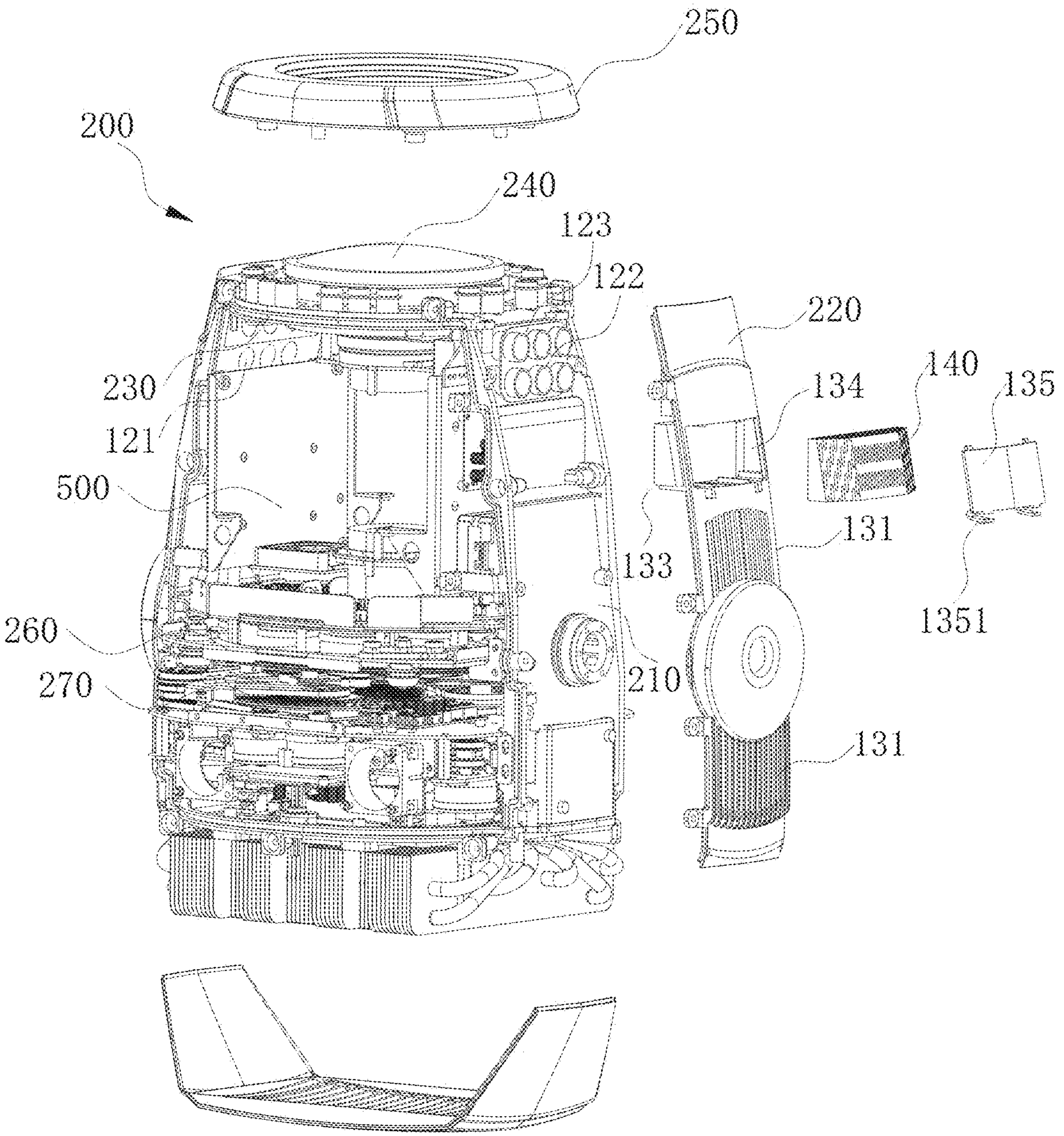
FIG. 4 is an exploded view of a light head shown in FIG. 3.
Figure 5:
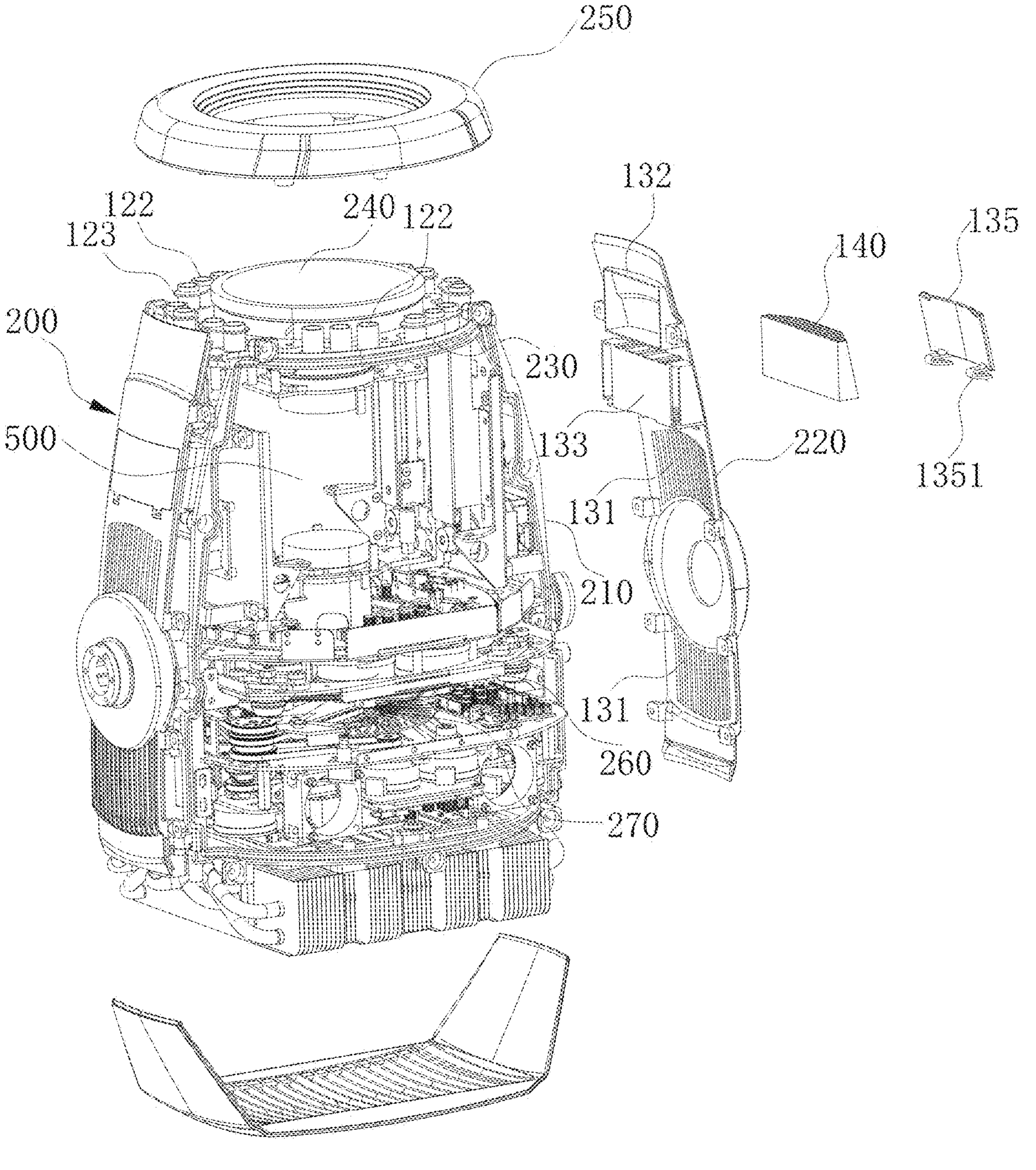
FIG. 5 is another exploded view of the light head shown in FIG. 3.

As shown in FIGS. 4 and 5, the first side plate 120 is formed by the support plate 210 of the light head 200 pivoting with the arm 300 and the second side plate 130 is formed by the side cover 220 covering outside the support plate 210. With the existing support plate 210 and side cover 220 forming the waterproof ventilation module 100, additional components are not required, thereby achieving high space utilization and compact structure of the stage light fixture.

Additionally or alternatively, the first air vent 121 is arranged close to the light-outlet lens 240.

In this embodiment, as shown in FIGS. 4 and 5, the first side plate 120 is formed by the mounting plate 230 of the light-outlet lens 240 of the light head 200, so that air flows into the light head 200 and is discharged from the light head 200 at the light-outlet position. The second side plate 130 can be formed by the lens cover 250 covering the mounting plate 230, also may be formed by the side cover 220 covering outside the support plate 210 which pivots with the arm 300.

Figure 6:
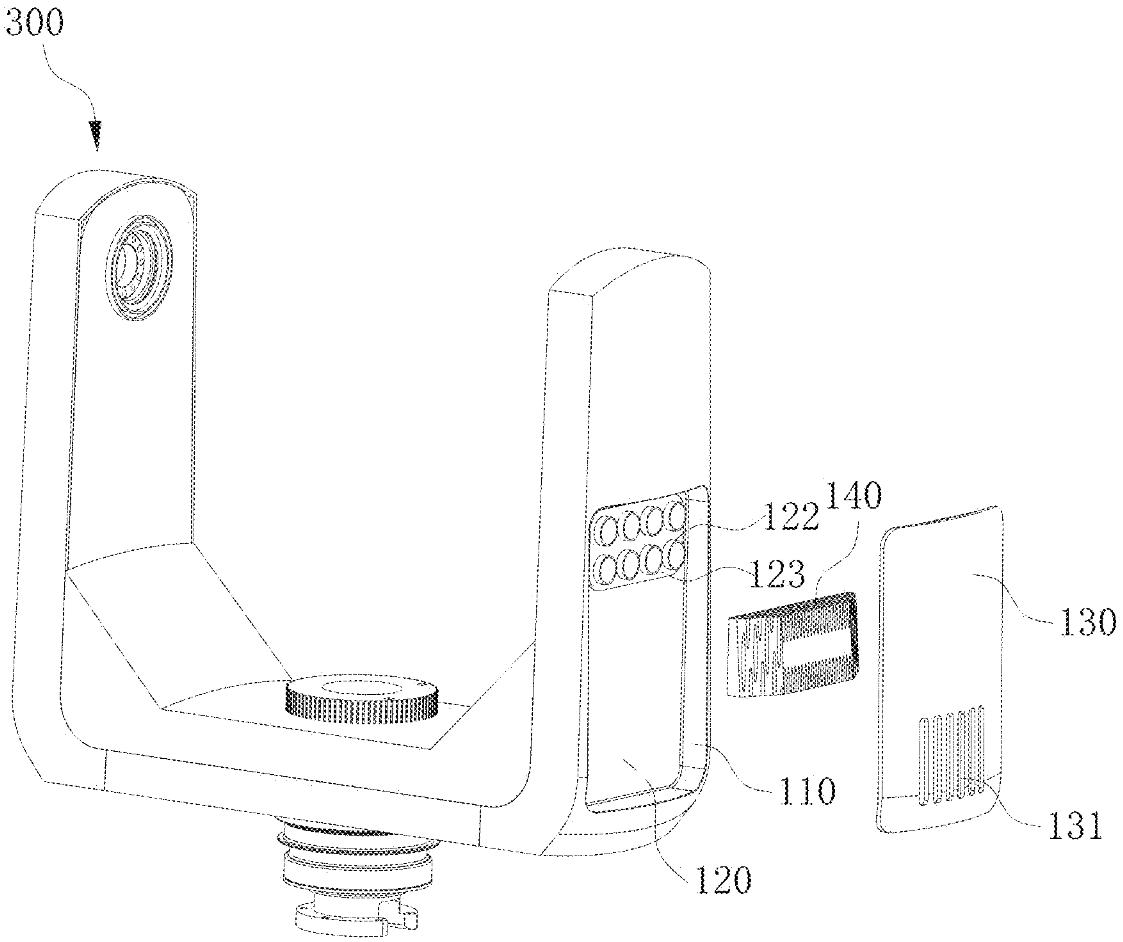
FIG. 6 is an exploded view of an arm shown in FIG. 3.

As shown in FIG. 6, with regard to the arm 300 for supporting rotation of the light head 200, the first side plate 120 is formed by the outer side wall of the arm 300, and the second side plate 130 is formed by the side cover covering the outer side wall.

Figure 7:
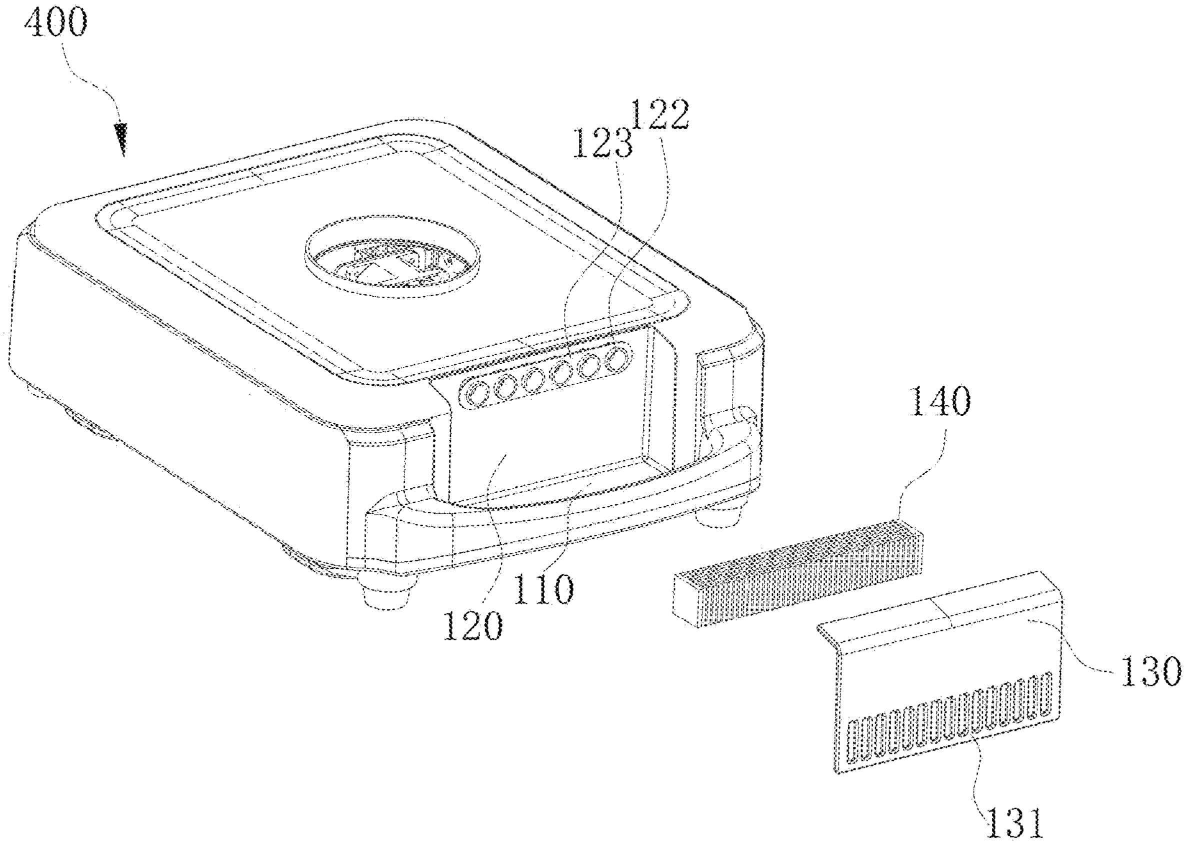
FIG. 7 is an exploded view of a base shown in FIG. 3.

As shown in FIG. 7, with regard to the base 400 for supporting rotation of the arm 300, the first side plate 120 is formed by the outer side wall of the base 400, and the second side plate 130 is formed by the side cover covering the outer side wall.

Obviously, the above-mentioned embodiments of the present invention are only examples for clearly illustrating the present invention, rather than limiting the mode of implementation of the present invention. For those of ordinary skill in the art, changes or alterations in other different forms can also be made on the basis of the above description. It is not needed and also not possible to list all the modes of implementation here. Any modification, equivalent replacement, improvement, etc. made within the spirit and principle of the present invention shall be included within the protection scope of the claims of the present invention.

What is claimed is:

1. A waterproof ventilation module, having a cavity which comprises a first side plate and a second side plate, wherein the first side plate is provided with at least one first air vent and at one side of the first side plate opposite to the second side plate is provided with at least one first water blocking baffle surrounding the first air vent, and the second side plate is provided with at least one second air vent, the first air vent and the second air vent being staggered in position.

2. The waterproof ventilation module according to claim 1, wherein a minimum distance between edges of the at least one first air vent and the at least one second air vent is more than 1 cm.

3. The waterproof ventilation module according to claim 1, wherein a height of the first water blocking baffle protruding from the first side plate is more than 0.5 cm.

4. The waterproof ventilation module according to claim 1, wherein an air passage between the at least one first air vent and the at least one second air vent is provided with an anti-dust net.

5. The waterproof ventilation module according to claim 4, wherein a side of the second side plate close to the first side plate is connected with a load support for bearing the anti-dust net, the second side plate is provided with a mounting opening for assembling and disassembling the anti-dust net and a cover for covering the mounting opening.

6. The waterproof ventilation module according to claim 1, wherein a water blocking ring is provided outside the first water blocking baffle.

7. The waterproof ventilation module according to claim 1, wherein a plurality of first air vents are provided, and only one first water blocking baffle is provided for surrounding all the first air vents.

8. The waterproof ventilation module according to claim 1, wherein a plurality of first air vents and a plurality of first water blocking baffles are provided, each water blocking baffle surrounds at least one of the plurality of first air vents.

9. The waterproof ventilation module according to claim 1, wherein at least one second water blocking baffle surrounding the at least one first water blocking baffle is provided at the second side plate.

10. The waterproof ventilation module according to claim 9, wherein the at least one first water blocking baffle and the at least one second water blocking baffle are staggered in a height direction.

11. The waterproof ventilation module according to claim 10, wherein a staggered height of the at least one first water blocking baffle and the at least one second water blocking baffle in the height direction is over 0.1 cm.

12. The waterproof ventilation module according to claim 9, wherein a water blocking ring is provided outside the at least one first water blocking baffle, and an outer edge of the water blocking ring is positioned out of the at least one second water blocking baffle.

13. The waterproof ventilation module according to claim 9, wherein only one second water blocking baffle is provided for surrounding the at least one first water blocking baffle.

14. The waterproof ventilation module according to claim 1, wherein the second side plate is detachably fastened to the first side plate.

15. A stage light fixture, comprising the waterproof ventilation module according to claim 1, wherein an accommodating cavity in one or more of a light head, an arm, or a base of the stage light fixture is in air communication with the outside via the waterproof ventilation module.

16. The stage light fixture according to claim 15, wherein an air inlet and an air outlet of the accommodating cavity are both provided with the waterproof ventilation module.

17. The stage light fixture according to claim 15, wherein the one or more accommodating cavities in the light head, the arm, or the base are in air communication with each other.

18. The stage light fixture according to claim 15, wherein the first side plate of the waterproof ventilation module is formed by a portion of a side wall of the accommodating cavity or a separate piece fixed on a side wall of the accommodating cavity, and the second side plate of the waterproof ventilation module is arranged outside the accommodating cavity.

19. The stage light fixture according to claim 18, wherein the first side plate is formed by a support plate of the light head pivoting with the arm and the second side plate is formed by a side cover covering outside the support plate.

20. The stage light fixture according to claim 18, wherein the first side plate is formed by a mounting plate of a light-outlet lens of the light head.

* * * * *